United States Patent [19]
Irwin

[11] Patent Number: 6,126,565
[45] Date of Patent: Oct. 3, 2000

[54] METHOD FOR CONTROLLING FLOW OF LUBRICATION IN AXLE ASSEMBLY AND AXLE ASSEMBLY WITH SELECTIVELY ADJUSTABLE DRAIN-BACK SPACER

[75] Inventor: Earl James Irwin, Ft Wayne, Ind.

[73] Assignee: Dana Corporation, Toledo, Ohio

[21] Appl. No.: 09/282,437

[22] Filed: Mar. 31, 1999

[51] Int. Cl.[7] ............................................. F16H 57/04
[52] U.S. Cl. ............................................................ 475/160
[58] Field of Search ................................. 475/159, 160; 74/607; 184/6.12

[56] References Cited

U.S. PATENT DOCUMENTS

| | | | |
|---|---|---|---|
| 2,037,173 | 4/1936 | Matthews | 475/160 |
| 4,084,450 | 4/1978 | Conroy . | |
| 4,157,045 | 6/1979 | Suzuki . | |
| 4,227,427 | 10/1980 | Dick | 184/6.12 X |
| 4,274,298 | 6/1981 | Ostrander . | |
| 4,586,395 | 5/1986 | Fukuchi et al. | 184/6.12 X |
| 4,751,853 | 6/1988 | Dissett . | |
| 5,415,601 | 5/1995 | Cilano . | |
| 5,624,343 | 4/1997 | Krisher . | |
| 5,624,344 | 4/1997 | Yehl et al. . | |
| 5,709,135 | 1/1998 | Baxter | 74/607 |

*Primary Examiner*—Charles A Marmor
*Assistant Examiner*—Ha Ho
*Attorney, Agent, or Firm*—Liniak, Berenato, Longacre & White

[57] ABSTRACT

A lubrication system of an axle assembly comprising a differential carrier, a side bearing assembly, an annular drain-back spacer provided therebetween, and a device for selectively positioning the drain-back spacer relative to the bearing assembly. The drain-back spacer is provided with a drain-back channel formed therethrough. A method is provided for controlling flow of lubricant between a differential gear and an axle tube by selectively adjusting the position of the drain-back channel in order to provide the desired lubricant flow path.

11 Claims, 6 Drawing Sheets

METHOD FOR CONTROLLING FLOW OF LUBRICATION IN AXLE ASSEMBLY AND AXLE ASSEMBLY WITH SELECTIVELY ADJUSTABLE DRAIN-BACK SPACER

FIELD OF THE INVENTION

The present invention relates to lubrication system of an axle assembly used in a power transmission system, such as one on a motor vehicle. More particularly, the invention relates to a method for controlling flow of lubrication between a differential gear and an axle tube, and the axle assembly with a selectively adjustable drain-back spacer for controlling the flow of a lubricant oil into and out of the axle tube assemblies in order to provide a desired lubricant oil flow path.

BACKGROUND OF THE INVENTION

A conventional axle assembly of a motor vehicle comprises a differential gear and a pair of drive shaft assemblies penetrating both sides thereof. A solid annular spacer is provided between a side bearing assembly and a differential carrier. The drive shafts are ordinarily disposed within the axle shaft tubes.

Normally in operation, lubricant from the differential carrier penetrates the axle shaft tubes due to the splashing of the lubricant by rotation of a differential ring gear, or by other means.

When axle assemblies are of full floating type, the wheel ends do not require lubrication. Therefore, the lubricant entrapped inside the axle tubes should be returned to a carrier bowl. For this purpose, the carrier bowl of conventional design is formed with a cast-in drain-back channel facing downward.

Alternatively, when axle assemblies are of semi-floating type, the wheel ends require adequate lubrication. In this case, it is desirable to keep certain amount of lubricant inside the axle shaft tubes. For this purpose, the carrier bowl is formed with the cast-in drain-back channel facing upward that allows lubricant to be trapped in the axle tube bores.

This requires two different variations of differential carriers: for full-floating type axle assemblies and for semi-floating type axle assemblies each provided with the cast-in drain-back channel, however positioned differently.

SUMMARY OF THE INVENTION

The present invention alleviates the drawbacks of the prior art. The present invention includes a method for controlling flow of lubrication between a differential gear and an axle tube, and an axle assembly with selectively adjustable drain-back spacer for controlling the flow of a lubricant oil into and out of axle tube assemblies and providing a desired lubricant oil flow path that would allow the axle assembly manufacturers to use the same differential gear carrier for both full-floating and semi-floating types of axle assemblies.

Furthermore the present invention provides a method for controlling flow of lubrication in the axle assembly between the differential gear and the axle tube by selectively positioning the drain-back spacer in a predetermined angular position.

Another advantage of the present invention is that it provides the axle assembly including the differential carrier and the separate drain-back spacer (instead of cast-in drain-back channel of the prior art) provided with a device for selectively positioning the drain-back spacer relative to the differential carrier.

DETAILED DESCRIPTION

Figure 1:
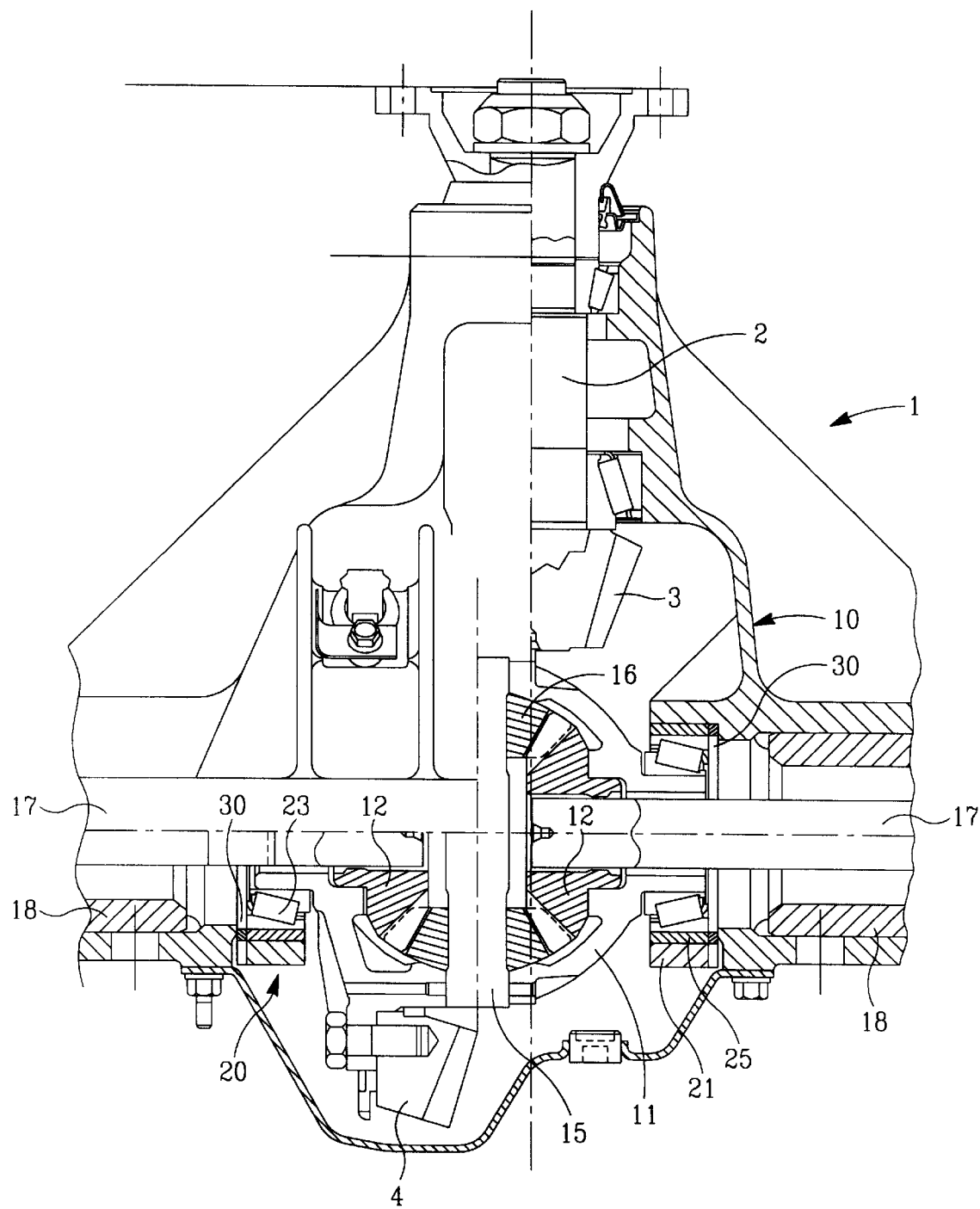
FIG. 1 is a transverse sectional view of the axle assembly of the present invention.
Figure 2:
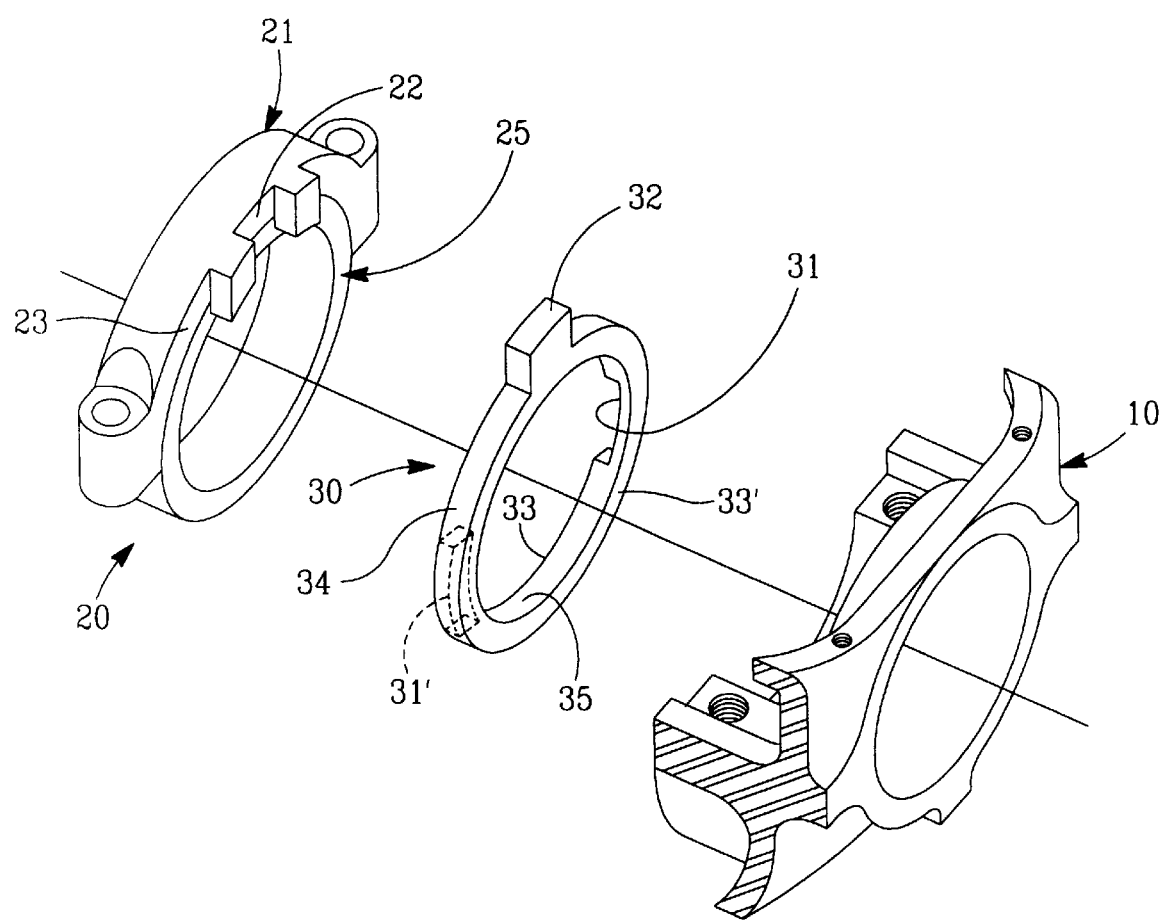
FIG. 2 is perspective view of the bearing cap, the bearing cup, the drain-back spacer and a portion of the differential carrier in accordance with a first embodiment of the invention.
Figure 3:
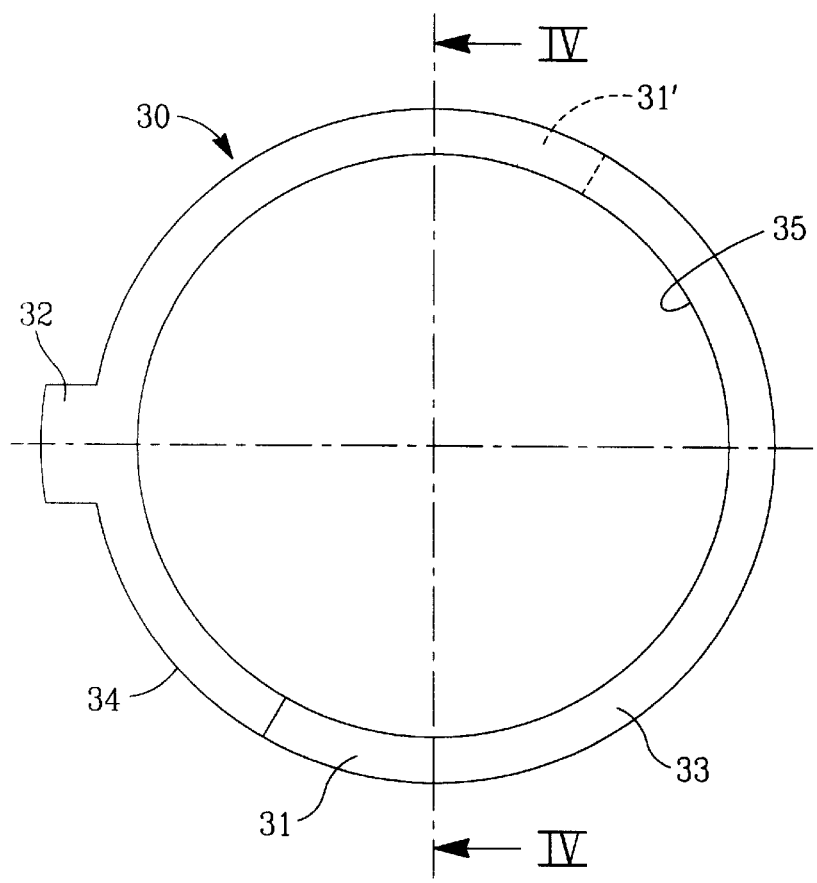
FIG. 3 is a plan view of the drain-back spacer.
Figure 4:
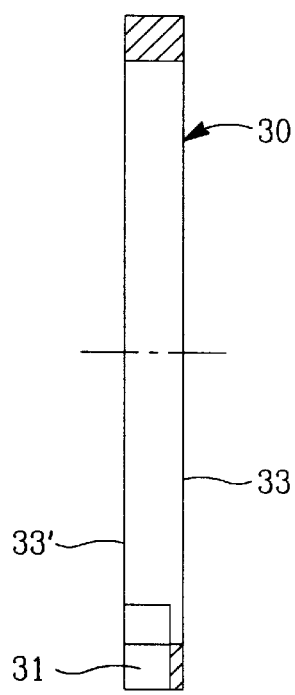
FIG. 4 is a cross-sectional view of the drain-back spacer taken in the direction of arrows IV—IV in the FIG. 3.
Figure 5:
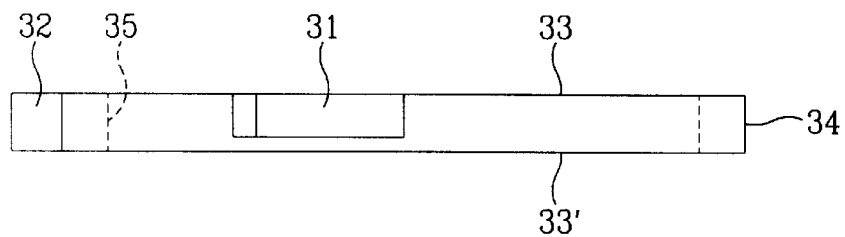
FIG. 5 is a side view of the drain-back spacer.

Referring first to FIG. 1 of the drawings, the axle assembly 1 of the present invention comprises a differential carrier 10 and a differential case 11 which is assembled with the differential carrier 10 via a side bearing assembly 20. The side bearing assembly 20 includes a bearing cap 21 and a roller bearing 23 ordinarily press-fitted or otherwise secured in a cylindrical bearing cup 25. A ring gear 4 is mounted to the differential case 11 to engage with a drive pinion 3 of a drive pinion shaft 2 which rotates by torque transmitted from a propeller shaft (not shown). In the differential case 11, there are provided a pair of pinion gears 16 and right and left side gears 12 engaging the pinion gears 16. The pinion gears 16 are mounted to the differential case 11 by a pinion shaft 15, and the side gears 12 are respectively connected to axle shafts 17 by spline engagement. The axle shafts 17 are housed inside two axle tubes 18 extending outwardly from opposite sides of the differential carrier 10. The axle assembly further includes a pair of annular drain-back spacers 30 sandwiched between the differential carrier 10 and the bearing cup 25.

Referring now to the FIGS. 2–5, the drain-back spacer 30 includes an annular body defined by an outer peripheral surface 34, an inner peripheral surface 35 and two side surfaces 33 and 33', and a lubricant drain-back channel 31 formed therethrough. In the preferred embodiment the drain-back channel 31 is in the form of a notch formed on the side surface 33 of said drain-back spacer 30, facing the bearing assembly 20. Alternatively, said lubricant drain-back channel 31 could be in the form of a bore (not shown) extending from the outer peripheral surface 34 to the inner peripheral surface 35 through the body of the spacer 30, or in the any other appropriate form.

The axle assembly 1 includes a device for selectively positioning the oil drain-back channel relative to the bearing cap 21 that will be described in details later.

As it was mentioned above, in operation certain amount of the differential lubricant penetrates the space defined by the axle tube 18 usually due to the splashing of the lubricant by rotation of the ring gear 4, or by other means.

If the full floating type axle assembly that does not require lubrication of its axle ends (not shown) is employed, the lubricant should be drained back to a differential carrier bowl (not shown).

If the axle assembly is used for a full floating type axle. If, alternatively, the semi-floating type axle that does require lubrication of its axle ends is employed, it is necessary to trap certain amount of the lubricant in the axle tubes 18.

The present invention contemplates a method for controlling flow of the lubricant in the axle assembly, more specifically, the flow of the lubricant draining back from the axle tube to the differential carrier bowl which will be described below.

During the assembling of the axle assembly 1, the drain-back spacer 30 having the drain-back channel 31, is provided between the differential carrier 10 and the bearing cup 25, the spacer 30 is then selectively positioned relative to the bearing cap 21 for properly orienting the drain-back channel 31 in order to provide a desired lubricant flow path. The final step is locking the spacer 30 in place by sandwiching it between the differential carrier 10 and the bearing cup 25, and securing the bearing cup 25 on the differential carrier 10.

In the preferred embodiment, the step of positioning the drain-back spacer 30 is achieved by rotating the spacer 30 to a predetermined angular position so as to orient the drain-back channel 31 in a desired position relative to the bearing cap 21.

In case of semi-float type axle assembly, when the axle ends do require lubrication, the drain-back spacer 30 is positioned such a way that the drain-back channel 31 is disposed in an uppermost position, thus trapping the certain amount of the lubricant in the axle tubes 18 for lubrication.

Alternatively, in case of full float type axle assembly, when the axle ends do not require lubrication, the drain-back spacer 30 is positioned such a way that the drain-back channel is disposed in a lowermost position (numeral 31' shown in dash lines on FIG. 2, 3 and 5), thus allowing the lubricant to return to the differential carrier bowl.

In accordance with the first embodiment of the present invention illustrated on FIGS. 2–5, the device for selectively positioning the drain-back spacer 30 includes a radially outwardly extending tab portion 32 formed on the drain-back spacer 30, and a corresponding notch 22 formed on a side surface 23 of the bearing cap 21, facing said drain-back spacer 30. During the assembling of the axle assembly, the tab portion 32 is received in the corresponding notch 22, thereby positioning the drain-back channel 31 in the desired position relative to the differential carrier 10, and locking the spacer 30 in place. As shown on FIG. 2, the lubricant drain-back channel 31 is formed on the same half portion of the annular spacer 30 as the tab portion 32. Thus, when the notch 22 receives the tab portion 32, the drain-back channel 31 is oriented in its uppermost position trapping the lubricant. If, on the other hand, the drain-back channel is formed on the opposite portion of the spacer 30 (numeral 31' shown in dash lines on FIGS. 2 and 3), then, when the notch 22 receives the tab portion 32, the drain-back channel 31' is disposed in its lowermost position allowing the lubricant to drain back to the carrier bowl.

Therefore, by changing the angular position of the tab portion 32 relative to the drain-back channel 31, selective positioning of the lubricant drain-back channel 31 could be achieved. For example, a number of drain-back spacers each having a different circumferential orientation of the drain-back channel 31 with respect to a tab portion 32 may be employed to selectively position the drain-back channel 31 with respect to the bearing cap 21.

Figure 6:
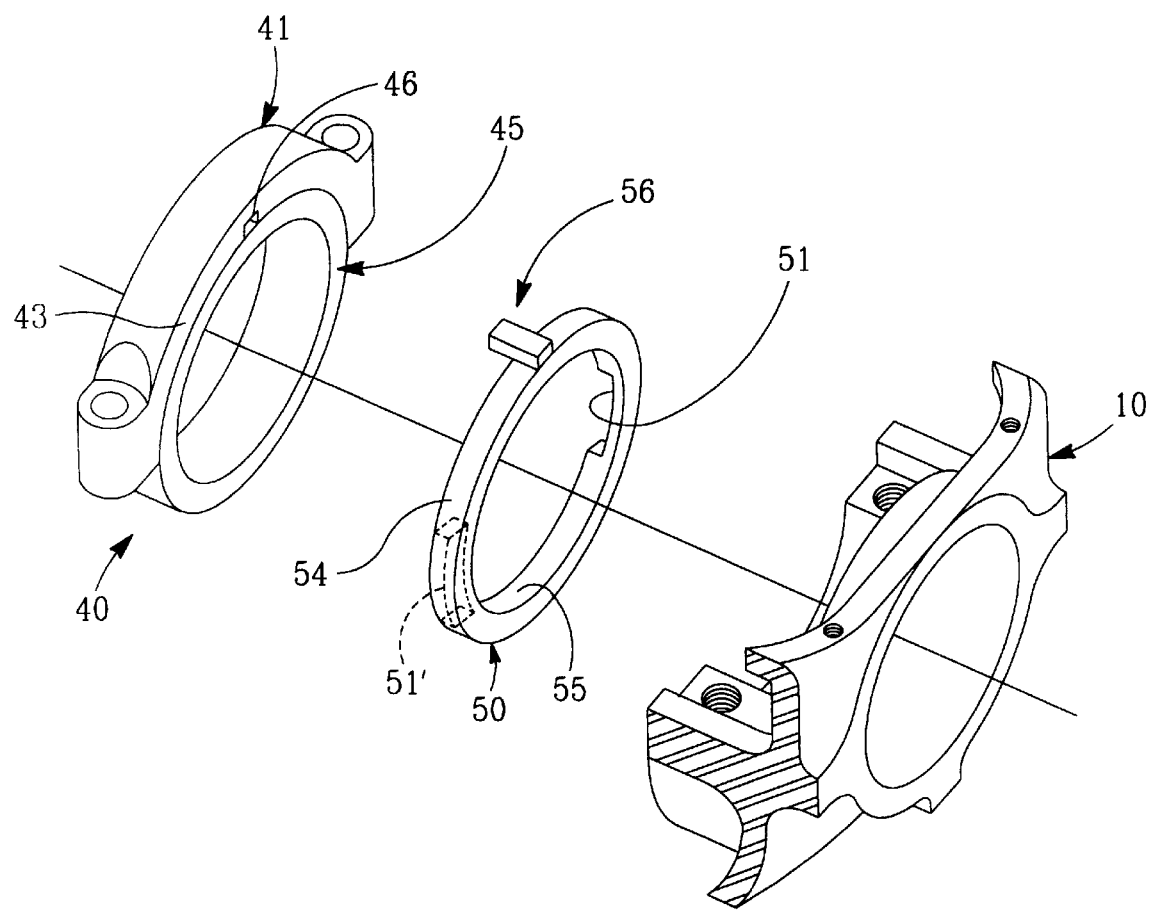
FIG. 6 is perspective view of the bearing cap, bearing cup, the drain-back spacer and a portion of the differential carrier in accordance with a second embodiment of the invention.

FIG. 6 shows the perspective views of a side bearing assembly 40 and a drain-back spacer 50 in accordance with the second embodiment of the present invention. The side bearing assembly 40 comprises a bearing cap 41, a roller bearing (not shown) and a cylindrical bearing cup 45. The roller bearing is ordinarily press-fitted or otherwise secured in the bearing cup 45. As illustrated, the spacer 50 is provided with a pin member 56 axially extending from the outer peripheral surface 54 of the spacer 50 toward the bearing cap. Correspondingly, the bearing cap 41 is provided with a matching recess 46 receiving said pin member 56. In the preferred embodiment, the pin member 56 is welded or otherwise secured on the outer peripheral surface 54 of the drain-back spacer 50. The pin member 56 and the matching recess 46 may have circular, rectangular, triangular or any other cross-section. During the assembly of the axle assembly, the pin member 56 is inserted into the matching recess 46, thus positioning and locking said drain-back spacer in place relative to the bearing cap 41. A number of drain-back spacers each having a different orientation of the drain back channel (such as shown at 51 —the uppermost position or 51'—the lowermost position) with respect to the pin member 56, could be used in order to provide various lubricant flow paths depending on the axle type employed.

Figure 7:
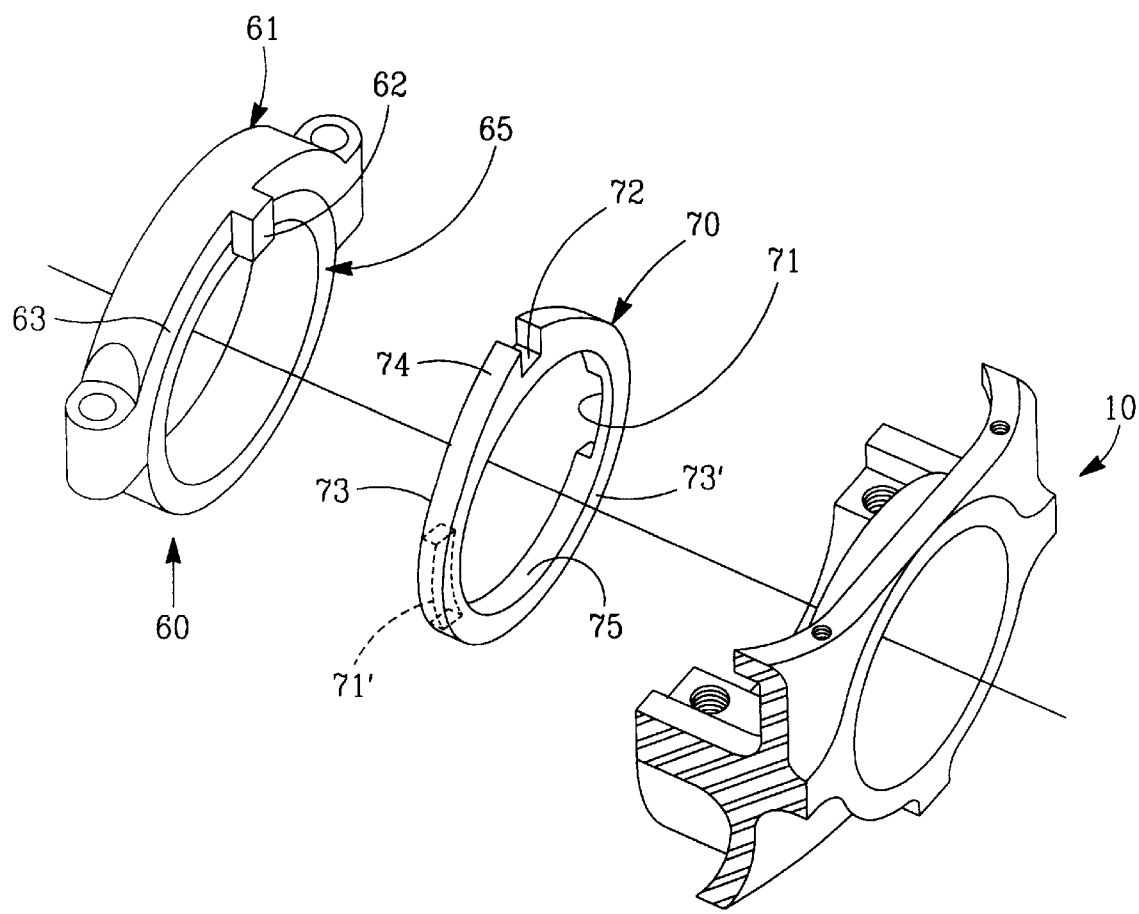
FIG. 7 is perspective view of the bearing cap, bearing cup, the drain-back spacer and a portion of the differential carrier in accordance with a third embodiment of the invention.

FIG. 7 shows the perspective views of a side bearing assembly 60 and a drain-back spacer 70 in accordance with the third embodiment of the present invention. The side bearing assembly 60 comprises a bearing cap 61, a roller bearing (not shown) and a cylindrical bearing cup 65. The roller bearing is ordinarily press-fitted or otherwise secured in the bearing cup 65. As illustrated, the bearing cap 61 includes a tab portion 62 axially extending from a side surface 63 of the bearing cap 61, facing the spacer 70. The spacer 70 includes a corresponding notch 72 formed on an outer peripheral surface 74 of the drain-back spacer 70, and a lubricant drain-back channel 71. During the assembling of the axle assembly, the tab portion 62 is received within the corresponding notch 62, thereby positioning the drain-back channel 61 in the desired position relative to the differential carrier 10 and locking said spacer 70 in place. As shown on FIG. 7, the lubricant drain-back channel 71 is formed on the same half portion of the annular spacer 70 as the notch 72. Thus, when the tab portion 72 receives the notch 72, the drain-back channel 71 is oriented in its uppermost position trapping the lubricant. If, on the other hand, the drain-back channel is formed on the opposite portion of the spacer 70 (numeral 71' shown in dash lines on FIG. 7), then, when the tab portion 62 receives the notch 72, the drain-back channel 71' is disposed in its lowermost position allowing the lubricant to drain back to the carrier bowl.

Therefore, by changing the angular position of the notch 72 relative to the drain-back channel 71, selective positioning of the lubricant drain-back channel 71 could be achieved. For example, a number of drain-back spacers each having a different orientation of the drain-back channel 71 with respect to the notch 72 may be employed to selectively position the drain-back channel 71 with respect to the bearing cap 61.

Figure 8:
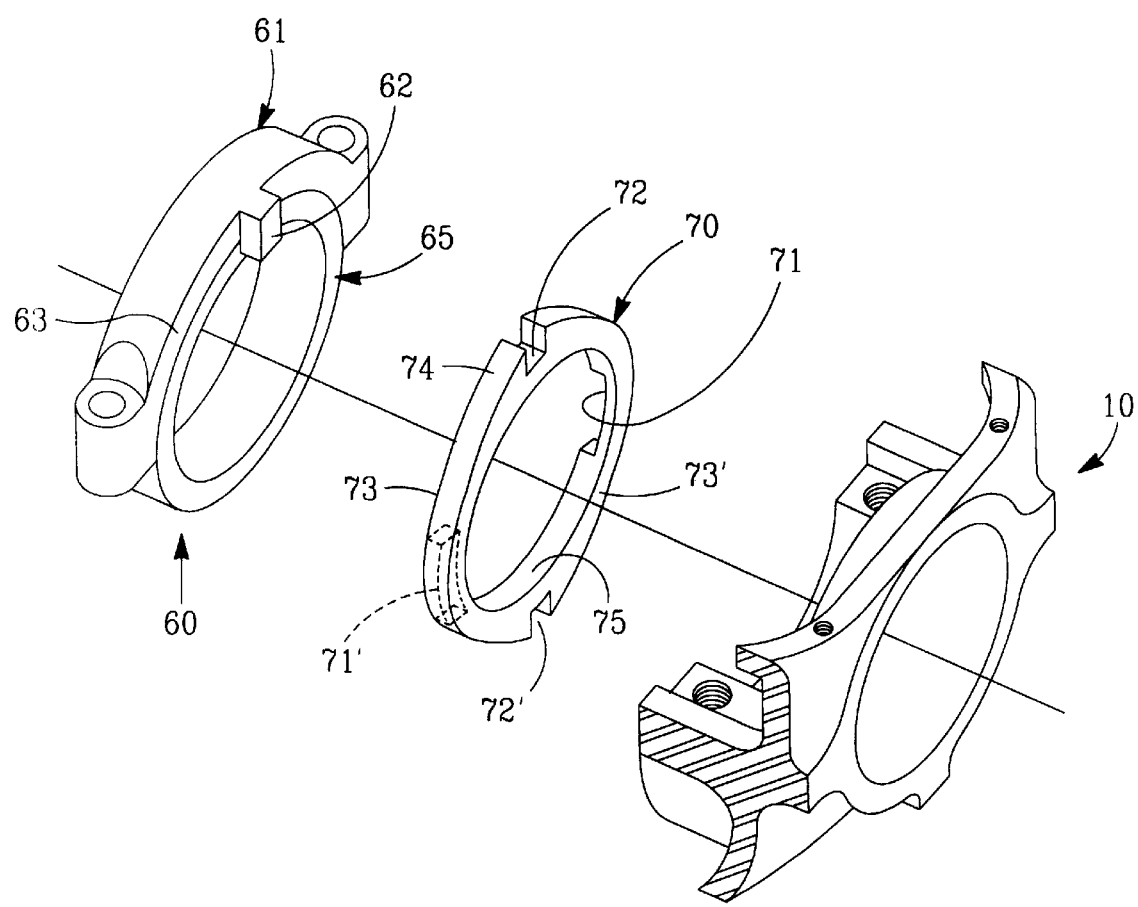
FIG. 8 is perspective view of the bearing cap, bearing cup, the drain-back spacer and a portion of the differential carrier in accordance with a fourth embodiment of the invention.

In the fourth embodiment illustrated on FIG. 8, the spacer 70 is provided with two notches 72 and 72' formed on the outer peripheral surface 74 of the spacer 70 generally opposite to each other (the spacers with more than two notches are also within the scope of the present invention). Each of said notches 72 and 72' could receive the tab portion 62 of the bearing cap 61. Thus, the spacer 70 is able to provide two distinct positions for the drain-back channel 71 relative to the bearing cap 61, and could be used for both full-floating type and semi-floating type axle assemblies.

While in accordance with the provisions of the Patent Statutes the preferred embodiments of the present invention has been illustrated and described, it will be apparent to those of ordinary skill in the art that various changes, modifications or variations may be easily made without deviating from the scope of the invention.

What is claimed is:

1. A method for controlling flow of a lubricant in an axle assembly, said method comprising the steps of:

providing a drain-back spacer adjacent to a side bearing assembly, wherein said bearing assembly includes a roller bearing secured within a bearing cup, and a bearing cap, and said spacer includes at least one oil drain-back channel for controlling the flow of a lubricant oil into and out of axle tube assemblies;

selectively positioning said drain-back spacer in one of a plurality of predetermined angular positions relative to the bearing cap in order to provide a desired lubricant oil flow path; and locking said drain-back spacer in place relative a differential carrier.

2. The method for controlling flow of a lubricant in an axle assembly as defined in claim 1, wherein said step of selectively positioning said drain-back spacer relative to the bearing cap, includes the step of rotating said spacer to a predetermined angular position, thereby positioning said drain-back channel to predetermined position relative to said bearing cap.

3. The method for controlling flow of a lubricant in an axle assembly as defined in claim 1, wherein said step of locking said drain-back spacer in place relative to the bearing cap, comprises the steps of:

forming at least one tab portion on one of said drain-back spacer and said bearing cap;

forming at least one notch on one of said bearing cup and said drain-back spacer; and locking said tab portion in said notch.

4. The method for controlling flow of the lubricant in an axle assembly as defined in claim 1 wherein said step of selectively positioning said drain-back spacer relative to the bearing cap comprises the step of positioning said drain-back spacer in a position when said lubricant drain-back channel is disposed in a lowermost position providing a lower drain-back that allows the lubricant to return to the differential carrier when wheel ends do not require lubrication.

5. The method for controlling flow of the lubricant in an axle assembly as defined in claim 1, wherein said step of selectively positioning said drain-back spacer relative to the bearing cap comprises the step of positioning said oil drain-back channel in an uppermost position providing an upper drain-back that allows the lubricant to be trapped in an axle tube bores when wheel ends require lubrication.

6. An axle assembly comprising an axle rotatably disposed within a side bearing assembly, said bearing assembly including a bearing cap and a roller bearing secured within a bearing cup;

an annular drain-back spacer adjacent and connected to said bearing assembly, said drain-back spacer including a lubricant drain-back channel extending through said spacer and adapted to communicate lubricant therethrough;

a means for selectively positioning said lubricant drain-back channel in any of a plurality of predetermined angular positions relative to said bearing cap and locking said drain-back spacer in place relative a differential carrier.

7. The axle assembly as defined in claim 6, wherein said means for selectively positioning said drain-back spacer relative to said bearing cap includes a tab portion formed on one of said drain-back spacer and said bearing cap, and a corresponding notch formed on one of said bearing cap and said drain-back spacer, wherein said notch receives said tab portion to maintain the relative position between said drain-back spacer and said bearing cap.

8. The axle assembly as defined in claim 6, wherein said means for selectively positioning said drain-back spacer relative to said bearing cap includes a pin member formed on said drain-back spacer, and a corresponding recess formed on said bearing cap, wherein said recess receives said pin member to maintain the relative position between said drain-back spacer and said bearing cup.

9. The axle assembly as defined in claim 6, wherein said means for selectively positioning said drain-back spacer relative to said bearing cap includes a tab portion formed on said bearing cap, and a corresponding notch formed on said drain-back spacer, wherein said notch receives said tab portion to maintain the relative position between said drain-back spacer and said bearing cap.

10. The axle assembly as defined in claim 6, wherein said means for selectively positioning said drain-back spacer relative to said bearing cap includes a tab portion formed on said bearing cap, and at least two notches formed on said drain-back spacer, wherein one of said notches receives said tab portion to maintain the relative position between said drain-back spacer and said bearing cap.

11. An axle assembly comprising an axle rotatably disposed within a side bearing assembly, said bearing assembly including a bearing cap and a roller bearing secured within a bearing cup;

an annular drain-back spacer adjacent and connected to said bearing assembly;

said drain-back spacer having an outer peripheral surface, and inner peripheral surface, and two annular side surfaces;

said drain-back spacer further including a lubricant drain-back channel extending through said spacer and adapted to communicate lubricant therethrough;

said drain-back spacer further including at least one tab portion or at least one notch formed on said outer peripheral surface of said drain-back spacer;

said bearing cap including a notch or a tab portion formed on the side surface of said bearing cap facing said drain-back spacer;

wherein said notch on the bearing cap receives said corresponding tab portion on said drain-back spacer, or said at least one notch on said drain-back spacer receives said corresponding tab portion on the bearing cap to maintain the relative position between said drain-back spacer and said bearing cap.

* * * * *